3,325,375
FUEL ELEMENT FOR A WATER-COOLED
NUCLEAR REACTOR
Johan Hilding Mogard, Lidingo, Sweden, assignor to Aktiebolaget Atomenergi, Stockholm, Sweden
Filed July 15, 1965, Ser. No. 472,157
Claims priority, application Sweden, July 22, 1964, 8,912/64
5 Claims. (Cl. 176—67)

This invention relates to a fuel element which is to be used in a water-cooled nuclear reactor and which utilizes a metallic nuclear fuel. The nuclear fuel should preferably consist of metallic uranium or a uranium alloy, but also other fuel materials can be used, such as metallic thorium or plutonium and alloys thereof. Reference will be made below, as an example, to a fuel element containing metallic uranium canned within a zirconium alloy. The term "can" is used below to indicate a shroud or casing which encloses the nuclear fuel to prevent it from coming into direct contact with the water. The nuclear fuel of a heavy water reactor is usually canned within a zirconium can, but also stainless steel, for instance, may be used as canning material.

Metallic uranium, used as a nuclear fuel, involves the disadvantage that its volume increases during the operation of the nuclear reactor. Said expansion of the uranium may cause a rupture of the can, particularly if the fuel element is utilized to a close approach to complete reaction.

It is an object of the invention to provide a fuel element in which the risk of rupture of the can as a result of the expansion of the nuclear fuel is reduced or eliminated, thus allowing the fuel element to be maintained in operation to a close approach to complete reaction.

The fuel element of the invention comprises a body of a metallic nuclear fuel, a metallic outer can enclosing said fuel body, and an intermediate can between said fuel body and said outer can, said intermediate can consisting of a material belonging to the group consisting of aluminium, magnesium and alloys thereof and having recessed portions allowing an expansion of the fuel body.

The invention will be described below with reference to the accompanying drawing, in which.

Figure 1:
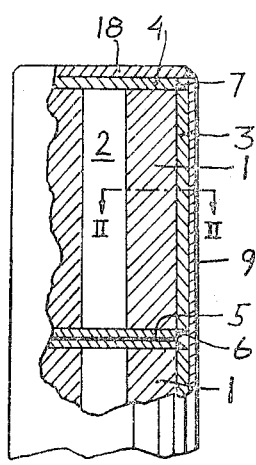
FIG. 1 illustrates, as an example, an embodiment of the fuel element of the invention.
Figure 1:
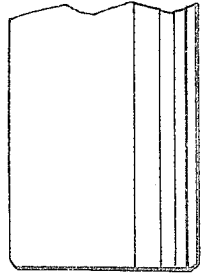
Figure 2:
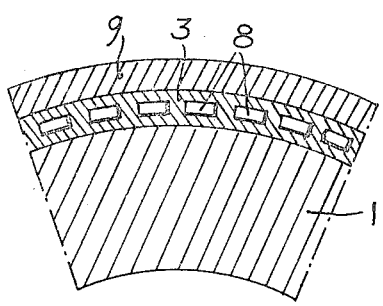
FIG. 2 illustrates, on a larger scale, a cross-section along the line II—II in FIG. 1.

The fuel element illustrated in FIGS. 1 and 2 contains a plurality of cylindrical fuel bodies 1 of natural uranium, each of said fuel bodies having an axial opening 2. The cylindrical surface of the fuel bodies is enclosed within an intermediate can 3 of aluminium. The upper and lower end surfaces of the uranium body are covered with aluminium plates 4 and 5 which are welded at 6 and 7 to the cylindrical can 3 to form an enclosure which completely encloses the uranium body. The can wall 3 contains holes or canals 8, see FIG. 2, which extend longitudinally through the entire height of the wall 3.

The fuel bodies 1 with their aluminium cans are placed in an outer tubular zirconium can 9 having top and bottom end walls 18. For ensuring a good heat transmission from the uranium body to the cooling water there should be a snug fit between the zirconium can 9 and the aluminium can 3, and between the aluminium can 3 and the uranium body 1. The aluminium can 3 should preferably be soldered to the uranium body in a known way by means of a thin intermediate layer of nickel (not shown).

In operation, the expansion of the uranium produces a plastic deformation of the aluminium can 3, and said plastic deformation results in a decrease in the volume of the holes or canals 8. Consequently, the expansion of the uranium does not result in a dangerous increase in the tension on the zirconium can. At the temperature of operation, usually 300–400° C., aluminium and magnesium have a sufficient plasticity for the purpose described. Any alloy consisting mainly of magnesium or aluminium and having a considerably lower hardness than the outer or main can 9 is also useful.

Figure 3:
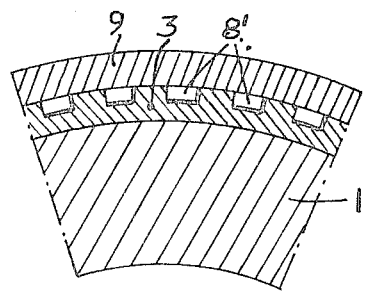
FIG. 3 illustrates a cross-section, similar to that of FIG. 2, of another embodiment of the invention.

In the embodiment of FIG. 3 the recessed portions consist of grooves 8' on the surface of the aluminium can 3, facing the zirconium can 9. The grooves 8' extend axially along the entire length of the aluminium can 3.

The thickness of the intermediate can should be 0.5–1.5 times the thickness of the outer can, and should preferably have approximately the same thickness. A thinner intermediate can does not produce the desired result, and a thicker intermediate layer results in the introduction of an undesired quantity of foreign material into the reactor.

I claim:
1. A fuel element for a water-cooled nuclear reactor, comprising a body of a metallic nuclear fuel, a metallic outer can enclosing said fuel body, and an intermediate can between said fuel body and said outer can and in contact with the entire outer surface of said fuel body, said intermediate can consisting of a material belonging to the group consisting of aluminium, magnesium and alloys thereof and containing therein recessed portions remote from said fuel body and allowing an expansion of the fuel body within said outer can without rupturing the latter.

2. A fuel element as claimed in claim 1, in which said recessed portions are grooves on the surface of the intermediate can facing the outer can.

3. A fuel element as claimed in claim 1, in which said recessed portions are canals extending longitudinally in the wall of the intermediate can.

4. A fuel element as claimed in claim 1, comprising a plurality of cylindrical fuel bodies, each fuel body having its cylindrical wall and its end walls covered with an intermediate can of the type defined, said fuel bodies, thus canned, being enclosed within a common tubular metallic outer can.

5. A fuel element as claimed in claim 1, in which the wall thickness of the intermediate can is 0.5–1.5 times that of the outer can.

References Cited

UNITED STATES PATENTS

| 3,184,392 | 5/1965 | Blake | 176—67 |
| 3,202,585 | 8/1965 | Kling et al. | 176—67 X |
| 3,210,255 | 10/1965 | Fairhurst | 176—67 |
| 3,212,988 | 10/1965 | Ringot | 176—67 |

CARL D. QUARFORTH, Primary Examiner.

BENJAMIN R. PADGETT, Examiner.

M. J. SCOLNICK, Assistant Examiner.